United States Patent [19]

Burkhart, III et al.

[11] Patent Number: 4,969,251
[45] Date of Patent: * Nov. 13, 1990

[54] METHOD OF MAKING BRAKE SHOE STOCK (II)

[75] Inventors: Gilbert B. Burkhart, III, Avella; Don Casper, Meadowlands; David E. Rosenberg, Pittsburgh, all of Pa.

[73] Assignee: Pittsburgh Coil Technology, Washington, Pa.

[*] Notice: The portion of the term of this patent subsequent to Apr. 18, 2006 has been disclaimed.

[21] Appl. No.: 338,890

[22] Filed: Apr. 17, 1989

Related U.S. Application Data

[63] Continuation-in-part of Ser. No. 177,379, Apr. 4, 1988, Pat. No. 4,821,400.

[51] Int. Cl.$^5$ ............................................. B23P 15/18
[52] U.S. Cl. ..................... 29/527.4; 29/417; 156/322; 156/331.1; 164/527; 427/327; 428/147
[58] Field of Search ................... 29/90.01, 90.7, 527.1, 29/527.2, 411, 527.4, 417; 106/36; 164/527; 188/251 R; 192/107 M; 148/6.15 R; 156/322, 331.1; 427/327; 428/147

[56] References Cited

U.S. PATENT DOCUMENTS

| | | |
|---|---|---|
| 2,536,183 | 1/1951 | Jamieson . |
| 2,978,354 | 4/1961 | Lesser . |
| 3,086,904 | 4/1963 | Uhleen . |
| 3,449,176 | 6/1969 | Klass et al. . |
| 3,868,276 | 2/1975 | Shatz et al. . |
| 3,924,035 | 12/1975 | Miller . |
| 3,981,762 | 9/1976 | Davis et al. . |
| 4,098,951 | 7/1978 | Wolff .......................... 188/73.35 X |
| 4,172,160 | 10/1979 | Stoner . |
| 4,459,335 | 7/1984 | Tanaka et al. . |
| 4,617,717 | 10/1986 | Yamamoto et al. ........... 29/527.2 X |
| 4,658,500 | 4/1987 | Engel et al. .................. 29/527.2 X |
| 4,821,400 | 4/1989 | Burkhart, III et al. ............ 29/527.4 |

Primary Examiner—Timothy V. Eley

[57] ABSTRACT

Pre-glued, coil-coated brake shoe stock is manufactured on a continuous coil coating line wherein a heavy gauge steel strip is continuously fed through abrasion and surface cleaning steps, optionally treated with a phosphoric acid/alcohol solution and then followed by application of a phenol-formaldehyde resin, a controlled curing step, and again coiled. The phenol-formaldehyde resin may have incorporated in it solid particles which will improve the dimensional stability, thermal properties and vibration and sound-dampening characteristics of the brake shoes. Brake shoes stamped from the stock made under the particular conditions described have higher shear strength and adhesion to the brake pad or lining materials than those of the prior art and have fewer problems in manufacturing.

19 Claims, No Drawings

METHOD OF MAKING BRAKE SHOE STOCK (II)

RELATED APPLICATION

This application is a continuation-in-part of our copending U.S. patent application Ser. No. 177,379 filed Apr. 4, 1988, now U.S. Pat. No. 4,821,400.

BACKGROUND OF THE INVENTION

Prior to the present invention it has been known to manufacture brake shoe stock by first cutting or "blanking" a brake shoe blank from the appropriate steel strip, then abrading the surface as in a grit blast tumbling device, followed by application of a phenol-formaldehyde resin or "glue" to provide adhesion for the pad or lining material. An uncut pre-glued brake shoe stock has not been commercially prepared because of the difficulty of handling coils of the gauge or thickness required for brake shoes, i.e. at least 0.12 inch thick and commonly up to 0.25 inch thick. Continuous coil coating treatment lines for steel strip of thicknesses commonly used for brake shoes—0.123 and 0.187 through 0.25 inch—are not readily available and accordingly the manufacture of finished brake shoes with pads or lining materials has been developed based on the treatment and handling of individual brake shoes rather than the preparation of a brake shoe stock from which the shoe may be cut, sheared or blanked.

Brake shoes for automobiles which are first cut or stamped from the unglued sheet and then treated tend to be somewhat deformed because of the asymmetrical effects of the tumbling abrading treatment to which they are commonly subjected, and tend not to retain an appropriate amount of "glue", adhesive or phenolic resin, in areas which are deformed during stamping and abrading. The uneven application of the resin will cause blistering of the resin on curing, voids in the application of the resin, and other erratic effects.

Continuous coil coating lines have been used in the past for many purposes. Continuous steel coil coating lines have been used for phosphate treatment, oiling, polishing, and the application of various permanent coatings such as paints, for example. So far as we are aware, however, they have not been adapted to the particular problem of making pre-glued brake shoe stock, which requires a thick gauge as herein described.

SUMMARY OF THE INVENTION

The present invention provides a more efficient, precise and repeatable method of making brake shoe stock and making it so that the brake pads or lining material will adhere to brake shoes made from it more tenaciously than they will to similar shoes or shoe stock made with similar materials in the past.

Our invention involves the continuous feeding of steel strip of a thickness up to about 0.25 inch through particular steps of surface abrasion, cleaning, optional phosphoric acid application, phenol-formaldehyde or other resin coating, curing, and quenching, to be described in more detail below. Our method is more efficient, precise and repeatable than previous methods in that it involves a continuous feed from a coil of a very heavy gauge steel, and provides a fresh (unexposed and uncontaminated) evenly distributed resin coating for curing to promote and enhance adhesion, which results in a product with greater adhesion for the brake pad or lining material. We believe the application of the phenol-formaldehyde resin immediately after a phosphoric acid/alcohol adhesion promoter enhances the tenacity of adhesion of the resin to the steel; in any event, we have developed a method for the partial curing of the resin which will assure the resin will neither be overcured nor undercured and accordingly will provide the optimum adhesion to the brake pad or lining materials as well. It is essential that the resin not be undercured because an undercured resin will tend to be absorbed by the brake pad prior to full curing and hence lose much of its basis for strength; in addition an undercured resin is vulnerable to damage during the slitting and stamping steps, and/or may cause delamination of a lining material due to the formation of water during the final curing cycle. In addition, even if the adhesion to the metal surface of the brake shoe is acceptable, an undercured resin will tend to be weak in the body of the resin above the surface. The resin should not be overcured because an overcured resin will have very little potential for chemical bonding with the pad; in addition an overcured resin will be brittle and vulnerable to spalling.

The addition of particles to the phenol-formaldehyde resin has also been found to enhance the desired properties of the preglued brake shoe stock. The particles can be either organic or inorganic and of any geometrical shape, e.g. spheres, fibers, flakes, and/or angular particles such as small chips. The particles enhance the dimensional stability, the thermal properties, and the vibration and sound-dampening characteristics of the phenol-formaldehyde resin. The dimensional enhancement is at least partially due to the stress relief which occurs at the particle/resin interface. The improvement of the vibration and sound dampening characteristics is due to an increase in free volume, the stress relief, and any inherent dampening characteristics of the particle.

The particles may be blended with the phenol-formaldehyde resin and applied through either roll coating or spraying, or by sprinkling or otherwise applying them directly to the previously applied uncured resin. The size of the particles can range from ten to one thousand microns and the percent volume with respect to the resin can range from 1–20; however, the size and percent volume are typically 100–500 microns and 1–5% respectively.

In a preferred method of practicing our invention, initially a steel strip is fed from a coil through a looping pit to provide for slack, as an accumulator to provide time to join coil ends, and to enable better control over the downstream velocity of the strip, through an entry tension device of a type common in the art of controlling heavy gauge steel strip. The steel strip may be a maximum of 0.25 inch thick and may be of any convenient width; generally the width will be no more than about 48 inches. The width is limited only by the availability of the various downstream components capable of performing the required functions on various widths and handling the weight of the wider ones. The tension device and other mechanisms for continuously moving the coil are built accordingly. From the entry tension device the strip is advanced to an abrading section in which, by sandblasting, gritblasting, ordinary mechanical abrading, revolving or otherwise moving (preferably high speed) abrasive brushes or other treatment such as with impinging glass particles, shot, aluminum oxide, carbide-tipped bristles, grit or the like, the surface is roughened to provide more surface area for contact with the resin and thus to create better adhesion, i.e. an "anchor pattern." The anchor pattern should exhibit angular surfaces from about 0.8 to about 1.4 mil deep generally devoid of roundness or spherical definition beyond the surface.

From the abrading section the strip proceeds to the cleaning section where the strip, particularly the abraded surface to be coated, is cleaned with a heated alkaline or acid cleaner. Any method of application which is effective is contemplated within our invention; the cleaner will typically contain significant portions of sodium or potassium hydroxide and surfactants such as anionic, nonionic and/or cationic surfactants. Heating of the cleaning solution enhances the cleaning action and begins the process of elevating the temperature of the steel to promote the resin cure downstream in the process. Any increase in temperature is desirable but we find that the important cure process requires a temperature at the cleaning step of at least 100° F. and preferably 140°-160° F. Immediately after the cleaning section follows a rinse station where high-pressure, high velocity sprays or streams of heated water are directed onto the cleaned surface to remove the cleaning solution and any undesirable matter such as particles of metal remaining from the abrading step. The water should be heated at least to about 100° F. for enhanced detergent removal and to continue the warming of the steel. Preferably the water is at a temperature of about 120° F. to about 140° F. The actual temperature of the steel may vary somewhat, but it is preferred to maintain standard conditions by controlling the volume of the rinse water as well as the temperature; generally for a sheet 48 inches wide traveling at ten linear feet per minute, we will use about 260 gallons per minute. The water may be treated or filtered after use and recycled; however a final rinse should be fresh and should be applied to both surfaces of the sheet to minimize contamination of the strip surface. Excess water may be removed in any convenient manner such as squeege rolls or air blowing.

The strip then optionally proceeds to a phosphoric acid application section where a coating of phosphoric acid and alcohol, preferably isopropyl alcohol, is applied preferably by spraying. The phosphoric acid will catalyze the polymerization of the later-applied resin as is known in the art; it also has a passivating effect on the substrate. The phosphoric acid should have a concentration of about 1% to about 20%, preferably about 2-4%, and is essentially anhydrous, the rest of the solution being a relatively volatile carrier such as isopropyl alcohol. The acid solution should be applied evenly over the entire treated side. This may be accomplished on a moving strip far more effectively and efficiently with sprays than by any other method. A useful orifice size is about 0.009-0.011 inch in diameter. The phosphoric acid layer on the sheet is immediately flash-dried by evaporation of the isopropyl alcohol or other solvent. In evaporating due to the temperature of the steel, the isopropyl alcohol will take with it whatever small amounts of water are present—generally if the acid mixture is, say 98% isopropyl alcohol and 2% of an 85% concentration $H_3PO_4$ in water, essentially all the water will evaporate with the isopropyl alcohol when the steel has a temperature greater than 100° F.

It is also possible to apply the phosphoric acid by rolls, immersion, or otherwise; if rolls are used, they preferably will be maintained at a predetermined distance apart which is slightly less than the thickness of the strip, for example about 0.005 inch less than the thickness of a strip having a thickness contemplated herein, between 0.123 inch and 0.25 inch. The rolls should be motorized and may utilize supplemental or doctor rolls to apply the phosphoric acid solution to the applicator rolls prior to their contact with the strip surface, as is known in the coating art. While no single method of applying the phosphoric acid is free from shortcomings, we prefer to use the spray method because uniform application is more readily accomplished.

The strip then proceeds into the resin or "glue" applying section which is a critical portion of our process. The resin is preferably a phenol-formaldehyde resin known to be effective for cohering brake pads and lining materials to brake shoes. It comprises generally about 50% or more slightly cured phenol-formaldehyde resin, small quantities of unreacted phenol and formaldehyde, and the balance carriers such as propylene glycol monomethyl ether acetate and dipropylene glycol monomethyl ether. The phenol-formaldehyde resin may contain phenol derivatives and aldehydes other than formaldehyde. As is known in the art, the resin should be chosen to cure with heat and time, and the curing may be controlled by controlling the application of heat. Typically the resin at 50% by volume solids will have a Brookfield viscosity at room temperature of about 450 to about 700 cps. The viscosity at room temperature is too high for a practical spray system; accordingly to apply by spraying we heat the resin to at least 100° F. and preferably to the range of about 120° to about 175° F. before it enters the spray nozzle. The spray nozzles generally have orifices of any convenient size to effectively atomize the resin. A useful orifice size is about 0.059 inch in diameter but the size may vary considerably with the particular thickness of film desired. In any event, we have found that lowering the viscosity of the resin is essential for spraying. Heating a resin of the composition described above to a temperature of about 100° will lower the viscosity to about 80 cps, and at about 120° the viscosity is about 32 cps. There is little to be gained by using temperatures above about 175° F., since the viscosity is generally less than 2 cps at about 165°. Temperatures between 120° and 175° F. will not cause the resin to polymerize. Of course the viscosities will depend upon the particular composition of the resin, and for proper spray formation we use viscosities less than 80 cps and preferably less than about 25 cps. We optionally heat the air in the resin spray area, preferably an enclosed area, in order to maintain good control over the curing conditions which are effective almost immediately to begin the cure process. If heated, the air temperature of about 72° F. can be advantageously maintained at a constant. The spray is preferably controlled electrostatically as is known in the art to obtain an even covering which is preferably from about 0.0005 to about 0.0015 inch thick when dry; air jets may be used to minimize "wrap-around" as is also known in the art of electrostatic spraying. We may use either one or two coats of resin—if two coats are used, a first coat of, say, 0.6 mil is placed in a normal run and then a second coat of 0.6 to 0.8 mil may be cured through the resin section only. The resin may also be applied by motorized rolls—again, they should be kept a predetermined distance apart which is slightly less that the thickness of the strip, preferably about 0.005 inch less. Openings more than about 0.01 inch less than the strip thickness will tend to consume more energy than is necessary, may tend to create an undesirable crest in the center of the strip, and may tend to lay down a layer of resin thinner than desired. While for spray coating the viscosity of the resin should be less than about 80 cps, when used in roll application the resin should have a viscosity in the range of 100 to about 900 cps, preferably about 500 to 700 without particulates although a higher viscosity will be expected when the resin is loaded with particulates.

The resin may also contain the particulates described above. The particulates may also be added separately by simply sprinkling them immediately after the application of the phenol-formaldehyde.

From the resin application section the sheet is moved into the curing oven where the resin is baked to a carefully partially cured condition. The curing advantageously takes place at oven air temperatures from about 440° F. to about 475° F. which may be monitored by a reading from a temperature scanner. The temperature and time of cure are also of course functions of the speed of the sheet. Generally the strip will be moving throughout the entire continuous operation at a speed of about ten linear feet per minute but this may be varied from somewhat lower to as much as 30 or more feet per minute to maintain an exit metal temperature from the oven of about 350°-375° F., depending on the type and composition of the heat-curable resin. Higher oven air temperatures must be used if the sheet moves faster. Persons skilled in the art will recognize that this is a significant improvement over the prior art process of coating and curing the pre-cut or blanked shoe parts at lower temperatures for longer periods of time.

Beyond the curing oven and the temperature scanner is the quench tank which reduces the temperature of the strip to ambient within a very short time, thus further controlling the degree of cure. Another tension device may be employed to assist in the control of the velocity and tension of the strip, and the strip may then be coiled at a rewinder and shipped elsewhere for manufacturing the brake shoes. The shoe blanks may be stamped from the stock with little or no discernable effect on the coating.

Tests were run on brake shoes manufactured from pre-glued coil-coated brake shoe stock made by our process to compare them with brake shoes made in the conventional manner. Table 1 represents the results of shear tests on about 25 brake shoe samples for each of the types of shoes represented on the tops of the columns. The shear test involves the application of pressure or shear force measured in pounds at the point of shear. It will be seen that the fully cured double coated shoes are superior to all the others, and the pre-glued shoes generally are superior to the conventional shoes.

TABLE 1

| Shear results in shear force in pounds at shear | | | |
|---|---|---|---|
| | Conventional | One Coat | Two Coats |
| Partial cure | | | |
| Average | 10,050 | 9,899 | 10,266 |
| +3 Sigma | 12,648 | 12,002 | 11,847 |
| −3 Sigma | 7,452 | 7,796 | 8,685 |
| Full cure | | | |
| Average | 11,657 | 11,583 | 12,203 |
| +3 Sigma | 14,480 | 14,485 | 15,212 |
| −3 Sigma | 8,834 | 8,331 | 9,194 |

Salt spray tests were also performed to compare the corrosion of brake shoes made by our process with conventional shoes. In these tests, a 5% salt solution was sprayed onto heated brake shoes which have been scribed with an "X". The degree of corrosion was then visually compared and rated with the following results.

| SAMPLE | CONDITION | CATALYST APPLIED (Y/N) | 3/8/88 (96 Hrs) | RATINGS 3/11/88 (144 Hrs) | 3/14/88 (216 Hrs) | 3/18/88 (312 Hrs) |
|---|---|---|---|---|---|---|
| 1 | As Received | N | 6 | 6 | 7 | 7 |
| 2 | As Received | Y | 5 | 2 | 4 | 4 |
| 3 | *Alkaline Cleaned | N | 3 | 4 | 6 | 6 |
| 4 | *Alkaline Cleaned | Y | 1 | 1 | 1 | 1 |
| 5 | *Alkaline Cleaned ***NR | N | 9 | 8 | 9 | 9 |
| 7 | *Alkaline Cleaned ***NR | Y | 8 | 7 | 8 | 8 |
| 8 | **Acid Cleaned | N | 4 | 3 | 2 | 3 |
| 10 | **Acid Cleaned | Y | 2 | 5 | 3 | 2 |
| 11 | Blush rusted | Y | 7 | 9 | 5 | 5 |

*Ridoline 1089 (Amchem)
**DEC. Coat FE840 (Derby)
***NR = not rinsed

The "As received" specimens were not cleaned; "Catalyst Applied" means phosphoric acid was used in the preparation of the specimens. Samples 4 and 10 were made by our process; sample 1 was made by the conventional method.

Our invention also contemplates the use of a sound-dampening coating, layer, or lamination as is known in the art of making brake shoes wherein the sound-dampening material may be placed on the back of the brake shoe. Such coatings, layers or laminations may be of a wide variety of materials and our continuous line treatment lends itself well to the efficient placement of such coverings.

A further trial was run on nominal 0.128"×20" steel coil stock using a Black Brothers reverse roll-coating machine for application of the phenol-formaldehyde resin and using abrasive brushes in lieu of a grit blaster. The Black Brothers machine is capable of coating both sides of the strip; however, for this run it was configured to coat only the top side. The oven temperature was 400° F. with a line speed of 8 feet per minute. No phosphoric acid was applied.

The film thickness of the resin achieved in this trial was 0.3–1.0 mils. Brake shoe blanks were stamped from the coated strip and pads were applied, and the shoes tested in both the partially cured and cured states. For interpreting the following data it should be noted that the inboard type backing plates (blanks) have larger areas than the outboard blanks, as is the general convention in the brake art; accordingly the inboard shear test results tend to show higher shear forces.

|  | Partial Cure (Outboared) | Cured (Outboard) |
| --- | --- | --- |
| Sample size | 12 | 82 |
| Shear force (pounds) | | |
| Average | 8138.17 | 9141.27 |
| Std. Dev. | 484.07 | 720.89 |
| Low | 7190.00 | 6314.00 |
| High | 8834.00 | 10640.00 |
| Specification (5000–7000) | | |
| Percent below | 0 | 0 |
| Pecent above | 0 | 73.17 |

As may be seen from the above date, the use of a rollcoater to apply the resin, and the use of abrasive brushes, are effective techniques within our invention; moreover, phosphoric acid is not essential to achieve satisfactory shear test results.

Another trial was performed, this time also without the phosphoric acid, but employing abrasive brushes for the abrasion step and an electrostatic spray for the resin application step. The steel strip was 0.187 inch thick and was double passed at ten feet per minute. The oven temperature for both passes was set at 470° F. The phenol-formaldehyde resin was heated to 160° F. and the final film thickness was 0.9–1.1 mil. The results were as follows:

|  | Partial Cure (inboard) | Cured (inboard) |
| --- | --- | --- |
| Sample size | 51 | 50 |
| Shear (pounds) | | |
| Average | 8463.53 | 10057.80 |
| Std. Dev. | 780.82 | 820.67 |
| low | 6424.00 | 8094.0 |
| high | 9814.00 | 11544.00 |
| Specification (4500–7708) | | |
| below | 0 | 0 |
| above | 78.43 | 100 |

We claim:

1. Method of making brake shoe stock from a coil of steel strip of a thickness at least 0.123 inch comprising:
  a. continuously feeding strip steel from said coil
  b. preparing a surface of said strip by abrading it to make an anchor pattern thereon,
  c. cleaning said surface with a heated cleaning solution,
  d. rinsing said surface with a hot water rinse, to achieve a heated surface temperature of at least 100° F.,
  e. applying on said heated surface phosphoric acid in a concentration from about 1% to about 20%, whereby said phosphoric acid is flash dried,
  f. applying onto said surface a partially cured phenol-formaldehyde resin, and
  g. curing said phenol-formaldehyde resin under heat.

2. Method of claim 1 wherein the phosphoric acid is employed in a solution of anhydrous isopropyl alcohol.

3. Method of claim 1 wherein the resin is applied to achieve a dry thickness of about 0.0005 to about 0.0015 inch.

4. Method of claim 1 wherein the resin composition contains carriers as well as phenol-formaldehyde resin.

5. Method of claim 1 wherein the oven cure temperature for the resin is 440° to 470° F.

6. Method of claim 1 followed by quenching said strip.

7. Method of claim 1 wherein the cleaning solution and rinsing elevates the temperature of the surface to at least about 100° F.

8. Method of claim 1 wherein the Brookfield viscosity of the resin is less than about 80cps and the resin is sprayed onto the strip.

9. Method of claim 1 wherein the phenol-formaldehyde resin includes solid particles.

10. Method of claim 9 wherein the particles are from 10–1000 microns in largest dimension and about 0.1% to about 20% of the volume of the resin.

11. Method of claim 9 wherein the particles are from 100–500 microns in largest dimension and about 1 to about 5% of the volume of the resin.

12. Method of claim 1 wherein the resin has a viscosity of about 100 to about 900 cps and is rolled onto the strip.

13. Method of claim 12 wherein the resin is applied with rolls which are held at a distance apart slightly less than the thickness of the strip.

14. Method of claim 1 wherein the phosphoric acid is rolled onto the strip.

15. Method of claim 13 wherein the phosphoric acid is applied with rolls which are held at a distance apart slightly less than the thickness of the strip.

16. Method of claim 1 wherein the anchor pattern created in the abrading step exhibits angular surfaces from about 0.8 to about 1.4 mil deep generally devoid of roundness or spherical definition beyond the surface.

17. Method of making brake shoe blanks comprising abrading a continuous steel strip having a thickness of about 0.123 inch to about 0.25 inch, applying a synthetic heat-curable resin thereto for application of a brake pad, at least partially curing said resin with heat, and cutting said strip into brake shoe blanks.

18. Method of claim 17 wherein the abrading step is conducted to create an anchor pattern exhibiting angular surfaces from about 0.8 to about 1.4 mil deep generally devoid of roundness or spherical definition beyond the surface.

19. Method of claim 17 wherein the strip is heated prior to application of the resin.

* * * * *